2,899,324

PROCESS AND COMPOSITIONS FOR IMPROVING CLAY PRODUCTS

James G. MacArthur, Baxter Springs, Kans., assignor to Spencer Chemical Company, a corporation of Missouri No Drawing. Application April 19, 1957
Serial No. 653,763

20 Claims. (Cl. 106—72)

This invention is related to the manufacture of kiln-fired ceramic products, such as brick and tile. More specifically, this invention is related to the manufacture of improved ceramic products through the use of hexamethylenetetramine or hexamethylenetetramine in combination with inorganic ammonium salts effectively to control "coring," and thereby give a product possessing improved strength and dimensional properties.

In the manufacture of brick and tile products, the finely divided clay or shale is mixed with varying amounts of water to provide the proper plasticity, formed into the desired shape, dried and fired in either periodic (batch) or tunnel (continuous) kilns to form the finished clay products. The word "clay" as used herein is intended to embrace both shale and clays, such as surface clays and fire clays.

During the firing process, various clay components are believed to be oxidized by the kiln gases and the clay then indurated (or hardened) by long exposure to higher temperatures (up to 2,000° F.). Improper firing, particularly with clays high in sulfur and/or carbon content, often results in an undesirable phenomenon, termed "coring," which seriously affects strength and dimensional properties in the final product. "Coring," as the name implies, is characterized by a black, blue, grey, brown or red core in the finished clay product which may extend completely to the surface. Black coring is generally the most severe. Upon oxidation, which occurs during the firing, the black compounds change from the characteristic black or dark color to red or buff color. Under certain conditions, the complete oxidation of the dark colored compounds appears to be relatively easy to accomplish. Under other conditions the black color appears fixed and extremely difficult if not impossible to oxidize. The exact conditions under which the black core becomes fixed are unknown, but the phenomenon appears to be associated with the deformation or plastic point of the clay or shale, wherein the material becomes glass-like before oxidation is complete. A secondary disadvantage of coring, particularly in the brick and tile industry, is a discoloration which results from a "bleeding through" of the core. Such a discoloration is very unsightly, for instance, on the brick and mortar joints of a brick wall.

Coring can be successfully controlled in certain clays by lengthening the firing cycle so that oxidation is complete. In other clays, coring cannot be economically controlled by lengthening the firing cycle. The control of coring by chemical additives is highly desirable in either case so that the firing cycle can be shortened and kiln production substantially increased.

Many attempts have been made in the past to control coring, such as by adding pre-roasted clay to the clay mix so that part of the oxidation is already accomplished. Although the final firing cycle is reduced somewhat, the total energy requirements for firing are the same, hence no advantages are gained. Another approach has been more finely to divide the clay so that more surface is exposed to oxidation, but this has not proven too successful.

A recently proposed method of controlling coring involves the addition of ammonium chloride to the clay mix prior to firing. It is stated that the ammonium chloride lowers the temperature of dissociation of the sulfide compounds thought to be responsible in main for coring, thus allowing them to be oxidized in a shorter period of time. However, ammonium chloride used separately does not give good control in many clays and in fact has adverse effects when used with some clays, particularly with respect to the structural properties and the water absorption properties of the resulting products. Also, because of its inherent acidity ammonium chloride causes serious corrosion problems in the metal clay products manufacturing equipment and produces a prominent discoloration throughout light-colored clay products. Because of these critical shortcomings, ammonium chloride has had very limited application in the industry.

In attacking the above-described problems of the brick, tile and related industries, I have discovered that hexamethylenetetramine, separately and in various combinations with inorganic ammonium salts, will effectively control coring in kiln-fired clay and shale products. The inorganic ammonium salts that may best be used include the common inorganic ammonium salts such as ammonium nitrate, ammonium sulfate and ammonium phosphate. Ammonium chloride may also be used in combination with hexamethylenetetramine effectively to control coring. Although this additive combination retains the corrosive characteristics of the ammonium chloride, it is less corrosive than ammonium chloride alone. Surprisingly, the combination of ammonium chloride with hexamethylenetetramine is much more effective in the control of coring than ammonium chloride alone.

Hexamethylenetetramine, usually known as hexamine, may be produced by the reaction of an aqueous solution of formaldehyde with ammonia. The reaction may be represented as follows:

$$6CH_2O + 4NH_3 \rightarrow (CH_2)_6N_4 + 6H_2O$$

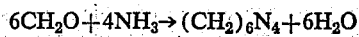

Hexamine is a crystalline solid which is readily soluble in water. It sublimes with slight decomposition upon heating in air but does not melt and is relatively non-toxic and non-corrosive.

Because of the many variations in the chemical composition of clays and shales, the most effective additive combination varies slightly from one clay to another.

I have found that where coring conditions are not too severe, hexamine may be used separately as an effective additive. However, where conditions are more severe, I have found that it is preferable to use a combination of hexamine with an inorganic ammonium salt. The optimum additive combination appears to be hexamine and ammonium nitrate. This additive combination, when used with various shales and clays, such as surface clays or fire clays, is very effective in controlling coring in kiln-fired products.

The total amount of additive or additive combination need not exceed a concentration of about 3% by weight of the dry clay. Amounts in excess of 3% may be used; however, increased amounts apparently do not increase the desired effects proportionately. Thus, when hexamine is used as a single additive, the concentration can be in the range of .001% to 3%. For additive combinations, the concentration can be in the range of .001% to 1% of hexamine in combination with .005% to 2% of an inorganic ammonium salt, such as ammonium nitrate, ammonium chloride, ammonium sulfate and ammonium phosphate. When hexamine is used as a single additive, the preferred concentration is .05% to 1%, based on dry clay. When an additive combination is used, the preferred concentration is (a) from .01% to .5% (based on dry clay) of hexamine in combination with (b) from .01% to 1% (based on dry clay) of the inorganic ammonium salt.

With additive combinations, the ratio of inorganic salt (preferably ammonium nitrate) to hexamine may vary over a wide range. Generally speaking, I have found that there should be an excess of the inorganic ammonium salt to the hexamine. I have further found that an ammonium salt to hexamine weight ratio in the range of about 1:1 to about 10:1 results in a very effective additive combination, with even higher ratios (up to about 80:1) being workable in many cases.

It is apparent that more than one inorganic ammonium salt may be used in the additive combinations of this invention. Thus, such an additive combination may, for example, include a mixture of ammonium nitrate and ammonium sulfate together with hexamine. Because of this, the term "inorganic ammonium salt" is intended to comprehend the salts individually as well as apparent mixtures of them. Other equally obvious equivalences are also intended to be included.

The additive and additive combinations of this invention are all crystalline solids, providing a stable material with negligible vapor pressure under ordinary conditions. These solid materials are free-flowing and are easily packaged and handled. In the practice of this invention, the dry additive or additive combination may be added in the proper amount to the dry clay or shale before mixing with water or, since the additive and additive combinations are water soluble, a water solution of known concentration and composition may first be prepared and the solution introduced in the proper amount into the clay mix in the pug mill which is the apparatus in which water and clay are admixed to form mud of the right consistency to be fed to the extruders or molds in which the clay products are formed. These procedures can be readily adapted to the various processes for making clay and shale products such as the soft mud process, the stiff mud process and the dry press process, all of which vary significantly only by the water content of the mud fed into the clay product forming unit.

The following examples clearly illustrate the methods and compositions of this invention.

The raw shale used in these experiments produced buff-colored clay products when fired and had an analysis by weight percent as shown in Table I.

Table I

| Ignition Loss,[1] Percent | SiO$_2$, Percent | Sulfur, Percent | Fe, Percent | Al$_2$O$_3$, Percent | CaO, Percent | Na$_2$O, K$_2$O, Percent | pH[2] |
|---|---|---|---|---|---|---|---|
| 10.29 | 54.15 | 3.41 | 6.73 | 20.89 | 1.38 | 3.86 | 8.2 |

[1] Loss on ignition of dry shale at 800° C.
[2] Determined from a mixture of 5 g. shale in 50 ml. water.

Cylindrical test bricks 1¼" in diameter and 1½" long, containing the additives, were pressed from the raw shale in a hydraulic press. One blank brick, containing no additive, was fired for every additive brick in each experiment. A 9.5 hour firing cycle was used and the maximum temperature was 1000° C. In all of the examples, the firing was done in an electric muffle furnace which was modified in that a gas burner was built into the door of the furnace to supply additional heat and to create within the furnace an atmosphere which simulated the atmosphere normally found in a gas-fired brickyard kiln. The gas burner was fired with a methane-air mixture wherein the air exceeded methane on a volume basis by a ratio of 8 to 1. The 9.5 hour firing cycle consisted of an initial 3½ hour period during which the temperature was maintained at 700° C., followed by a second 3½ hour period during which the temperature was maintained at 800° C., followed by a 1 hour period during which the temperature was maintained at 1000° C., after which time the heating means were turned off and the furnace allowed to cool naturally for the last 1½ hour period. However, the door to the furnace was not opened until the end of the 9.5 hour firing cycle. The temperature in the furnace at the end of the 9.5 hour firing cycle, upon opening of the furnace door, was in the range of 600 to 700° C.

The rating system for coring in Tables II and III is based on the severity of the coring as determined from visual observation. The procedure was as follows:

The experimental bricks were broken in half and the cores arted numerically. Both the area and the color of the cores were considered. The higher the number, the larger the affected area. Zero means no coring, while ten means very extensive coring. In addition, letters were used to indicate the extent of the affected area which consisted of black core (or severe core) and that which consisted of brown core (or milder core).

A=0/4 brown core and 4/4 black core
B=1/4 brown core and 3/4 black core
C=2/4 brown core and 2/4 black core
D=3/4 brown core and 1/4 black core
E=4/4 brown core and 0/4 black core The number indicating the rating only relates to the surface affected with brown or black core, whereas the letter indicates the part of that area that is black. While a considerable amount of brown core can be tolerated, a small amount of black core may substantially detract from the quality of a brick. Consequently a reading of 5E indicates a better condition than a reading of 4D, which in turn is better than 3C, 2B, or 1A. All E's show a good condition (no black core) whereas all D's show a condition that is acceptable.

In Tables II and III, experimental data is set out for bricks which were compared in the above-described manner. In many cases, bricks containing the same amount and kind of additives were run through the same firing cycles at different times to reflect duplication of results. Series A shows data for the bricks initially run while series B and C show data for the duplicates. Blanks containing no additives were run in conjunction with bricks containing additives to serve as checks. These blanks were identical in every respect to the test bricks except for additive content.

Table II sets out experimental data for bricks containing hexamine alone as an additive. By comparing the blanks with the additive-containing bricks, it can readily be seen that coring was substantially reduced in each additive-containing brick.

Table II

| Additive | Percent | Average Core Rating | |
|---|---|---|---|
|  |  | Series A | Series B |
| Hexamine | .1 | 8A | 6A |
| Do | .2 | 8A | 5A |
| Do | .4 | 4E | 1E |
| Blank |  | 9A | 7A |

Table III sets out experimental data for bricks containing additive combinations of various ratios of hexamine with ammonium nitrate. Again, it can readily be seen that coring was substantially reduced in each additive-containing brick.

Table III

| Additive Combination | | | | Average Core Rating [1] | | |
|---|---|---|---|---|---|---|
| Additive | Percent | Additive | Percent | Series A | Series B | Series C |
| Hexamine | .02 | NH₄NO₃ | .2 | 4E | 1E | |
| Do | .02 | NH₄NO₃ | .4 | 8A | 5A | |
| Blank | | | | 9A | 7A | |
| Hexamine | .05 | NH₄NO₃ | .2 | 6A | 5E | |
| Do | .05 | NH₄NO₃ | .4 | 5A | 1E | |
| Blank | | | | 9A | 7A | |
| Hexamine | .05 | NH₄NO₃ | .3 | 7 | 8 | |
| Blank | | | | 9.5 | 10 | |
| Hexamine | .06 | NH₄NO₃ | .3 | 6E | | |
| Blank | | | | 8A | | |
| Hexamine | .1 | NH₄NO₃ | .1 | 4E | 4E | |
| Do | .1 | NH₄NO₃ | .2 | 6A | 5E | |
| Do | .1 | NH₄NO₃ | .4 | 5A | 1E | |
| Blank | | | | 9A | 7A | |
| Hexamine | .15 | NH₄NO₃ | .3 | 6E | | |
| Blank | | | | 8A | | |
| Hexamine | .2 | NH₄NO₃ | .1 | 5E | 4E | |
| Do | .2 | NH₄NO₃ | .2 | 5A | 1E | 0 |
| Do | .2 | NH₄NO₃ | .3 | | | 2 |
| Do | .2 | NH₄NO₃ | .4 | 0 | 0 | 7 |
| Blank | | | | 9A | 7A | 1.5 |
| Hexamine | .3 | NH₄NO₃ | .2 | | | 7 |
| Blank | | | | | | |

[1] Certain ratings were made on numerical basis only.

I have also found that the additives are effective in increasing the wet strength of the mud. By increasing the wet strength of the mud, losses resulting from the handling of the wet ware such as by bending, breaking and fingerprinting are substantially reduced. Sagging of the wet ware, encountered in handling, is also substantially reduced, providing a ware which possesses better dimensional properties. The following procedure was used in determining the wet strength of the additive-containing mud: Small ½" diameter by 2⅛" rods of the wet mud were extruded by means of a hydraulic press and the wet strength determined by suspending the rod from two points and applying pressure to its center. The weight required to bend the rod a predetermined distance in a given time was used as a measure of wet strength.

In Table IV, experimental data is set out showing the wet strength of additive-containing bricks and blanks containing no additives. Series B and C were duplicates of the initial run, which is represented as series A.

Table IV

| Additive | H₂O Content, percent | Series A | | Series B | | Series C | |
|---|---|---|---|---|---|---|---|
| | | Bending Strength in gms. | Breaking Strength in gms. | Bending Strength in gms. | Breaking Strength in gms. | Bending Strength in gms. | Breaking Strength in gms. |
| .05% Hexamine + .3% NH₄NO₃ | 18.2 | 119 | 190 | 120 | 188 | | |
| Blank | 18.2 | 92 | 161 | 70 | 176 | | |
| .05% Hexamine + .3% NH₄NO₃ | 19.6 | 82 | 111 | 83 | 99 | 77 | 125 |
| Blank | 19.6 | 51 | 95 | 59 | 85 | | |

It can readily be seen that the additives of this invention are effective in toughening the mud.

The detailed description and examples given herein are not to be construed as limiting the scope of this invention, and all modifications apparent to those skilled in the art are intended to be included.

I claim:

1. The method of manufacturing improved clay products which comprises adding to the clay mix from which the clay products are formed an additive consisting essentially of a member selected from the group consisting of (1) from .001% to 3% by weight (based on dry clay) of hexamethylenetetramine and (2) an additive combination consisting of (a) from .001% to 1% by weight (based on dry clay) of hexamethylenetetramine and (b) from .005% to 2% by weight (based on dry clay) of a member of the group consisting of ammonium nitrate, ammonium sulfate, ammonium chloride, ammonium phosphate and mixtures thereof; forming clay products from such admixture; and firing the clay products.

2. The method of manufacturing improved clay products which comprises adding to the clay mix from which the clay products are formed an additive combination consisting essentially of (a) from .001% to 1% by weight (based on dry clay) of hexamethylenetetramine and (b) from .005% to 2% by weight (based on dry clay) of a member of the group consisting of ammonium nitrate, ammonium sulfate, ammonium chloride, ammonium phosphate and mixtures thereof; forming clay products from such admixture; and firing the clay products.

3. The method of claim 2 wherein the additive combination is (a) from .001% to 1% by weight (based on dry clay) of hexamethylenetetramine and (b) from .005% to 2% by weight (based on dry clay) of ammonium nitrate.

4. The method of claim 2 wherein the additive combination is (a) from .01% to .5% by weight (based on dry clay) of hexamethylene tetramine and (b) from .01% to 1% by weight (based on dry clay) of ammonium nitrate.

5. The method of manufacturing improved clay products which comprises adding to the clay mix from which the clay products are formed from .001% to 3% by weight (based on dry clay) of hexamethylenetetramine; forming clay products from such admixture; and firing the clay products.

6. The method of claim 5 wherein the additive is from .05% to 1% by weight (based on dry clay) of hexamethylenetetramine.

7. A new additive for improving clay products consisting essentially of one part by weight hexamethylenetetramine and about one to about ten parts by weight ammonium nitrate.

8. A new additive for improving clay products consisting essentially of one part by weight hexamethylenetetramine and about one to about ten parts by weight of a member selected from the group consisting of ammonium nitrate, ammonium sulfate, ammonium phosphate and mixtures thereof.

9. The method of improving the wet strength of clay products during their manufacture prior to firing which comprises adding to the clay mix from which the clay products are formed from .001% to 3% by weight (based on dry clay) of hexamethylenetetramine.

10. The method of improving the wet strength of clay products during their manufacture prior to firing which comprises adding to the clay mix from which the clay products are formed an additive combination consisting essentially of from .001% to 1% by weight (based on dry clay) of hexamethylenetetramine and from .005% to 2% by weight (based on dry clay) of a member selected from the group consisting of ammonium nitrate, ammonium sulfate, ammonium chloride, ammonium phosphate and mixtures thereof.

11. The method of claim 10 wherein the additive combination is from .001% to 1% by weight (based on dry clay) of hexamethylenetetramine and from .005% to 2% by weight (based on dry clay) of ammonium nitrate.

12. The method of manufacturing improved clay products which comprises adding in the form of an aqueous solution to the clay mix from which the clay products are formed an additive consisting essentially of a member selected from the group consisting of (1) from .005% to 3% by weight (based on dry clay) of hexamethylenetetramine and (2) an additive combination consisting of (a) from .001% to 1% by weight (based on dry clay) of hexamethylenetetramine and (b) from .005% to 2% by weight (based on dry clay) of a member of the group consisting of ammonium nitrate, ammonium sulfate, ammonium chloride, ammonium phosphate and mixtures thereof; forming clay products from such admixtures; and firing the clay products.

13. The method of manufacturing improved clay products which comprises adding in the form of an aqueous solution to the clay mix from which the clay products are formed an additive combination consisting essentially of (a) from .001% to 1% by weight (based on dry clay) of hexamethylenetetramine and (b) from .005% to 2% by weight (based on dry clay) of a member of the group consisting of ammonium nitrate, ammonium sulfate, ammonium chloride, ammonium phosphate and mixtures thereof; forming clay products from such admixture; and firing the clay products.

14. The method of manufacturing improved clay products which comprises adding in the form of an aqueous solution to the clay mix from which the clay products are formed an additive combination consisting essentially of (a) from .001% to 1% by weight (based on dry clay) of hexamethylenetetramine and (b) from .005% to 2% by weight (based on dry clay) of ammonium nitrate; forming clay products from such admixture; and firing the clay products.

15. The method of manufacturing improved clay products which comprises adding in the form of an aqueous solution to the clay mix from which the clay products are formed from .001% to 3% by weight (based on dry clay) of hexamethylenetetramine; forming clay products from such admixture; and firing the clay products.

16. A new additive for improving clay products consisting essentially of an aqueous solution of one part by weight of hexamethylenetetramine and about one to about ten parts by weight of a member selected from the group consisting of ammonium nitrate, ammonium sulfate, ammonium phosphate and mixtures thereof.

17. A new additive for improving clay products consisting essentially of an aqueous solution of about one to about ten parts by weight of ammonium nitrate and one part by weight of hexamethylenetetramine.

18. The method of manufacturing improved clay products which comprises adding to the clay mix from which the clay products are formed an additive consisting essentially of a member selected from the group consisting of (1) from .001% to 3% by weight (based on dry clay) of hexamethylenetetramine and (2) an additive combination consisting of (a) from .001% to 1% by weight (based on dry clay) of hexamethylenetetramine and (b) from .005% to 2% by weight (based on dry clay) of an inorganic ammonium salt; forming clay products from such admixture; and firing the clay products.

19. The method of improving the wet strength of clay products during their manufacture prior to firing which comprises adding to the clay mix from which the clay products are formed an additive consisting essentially of a member selected from the group consisting of (1) from .001% to 3% by weight (based on dry clay) of hexamethylenetetramine and (2) an additive combination consisting of (a) from .001% to 1% by weight (based on dry clay) of hexamethylenetetramine and (b) from .005% to 2% by weight (based on dry clay) of an inorganic ammonium salt.

20. The method of manufacturing improved clay products which comprises adding in the form of an aqueous solution to the clay mix from which the clay products are formed an additive consisting essentially of a member selected from the group consisting of (1) from .001% to 3% by weight (based on dry clay) of hexamethylenetetramine and (2) an additive combination consisting of (a) from .001% to 1% by weight (based on dry clay) of hexamethylenetetramine and (b) .005% to 2% by weight (based on dry clay) of an inorganic ammonium salt; forming clay products from such admixture; and firing the clay products.

References Cited in the file of this patent

UNITED STATES PATENTS

| 1,719,168 | Chamberlain | July 2, 1929 |
| 2,562,549 | Hatch | July 31, 1951 |
| 2,838,410 | Francis | June 10, 1958 |

FOREIGN PATENTS

| 268,909 | Switzerland | 1950 |

OTHER REFERENCES

Modern Drug Encyclopedia & Therapeutic Index, 6th ed., pub. 1955 (page 1114).

Beilstein's Handbuch der Organischen Chemie, vol 26, second supplement 1952 (page 201).